Figure 1:
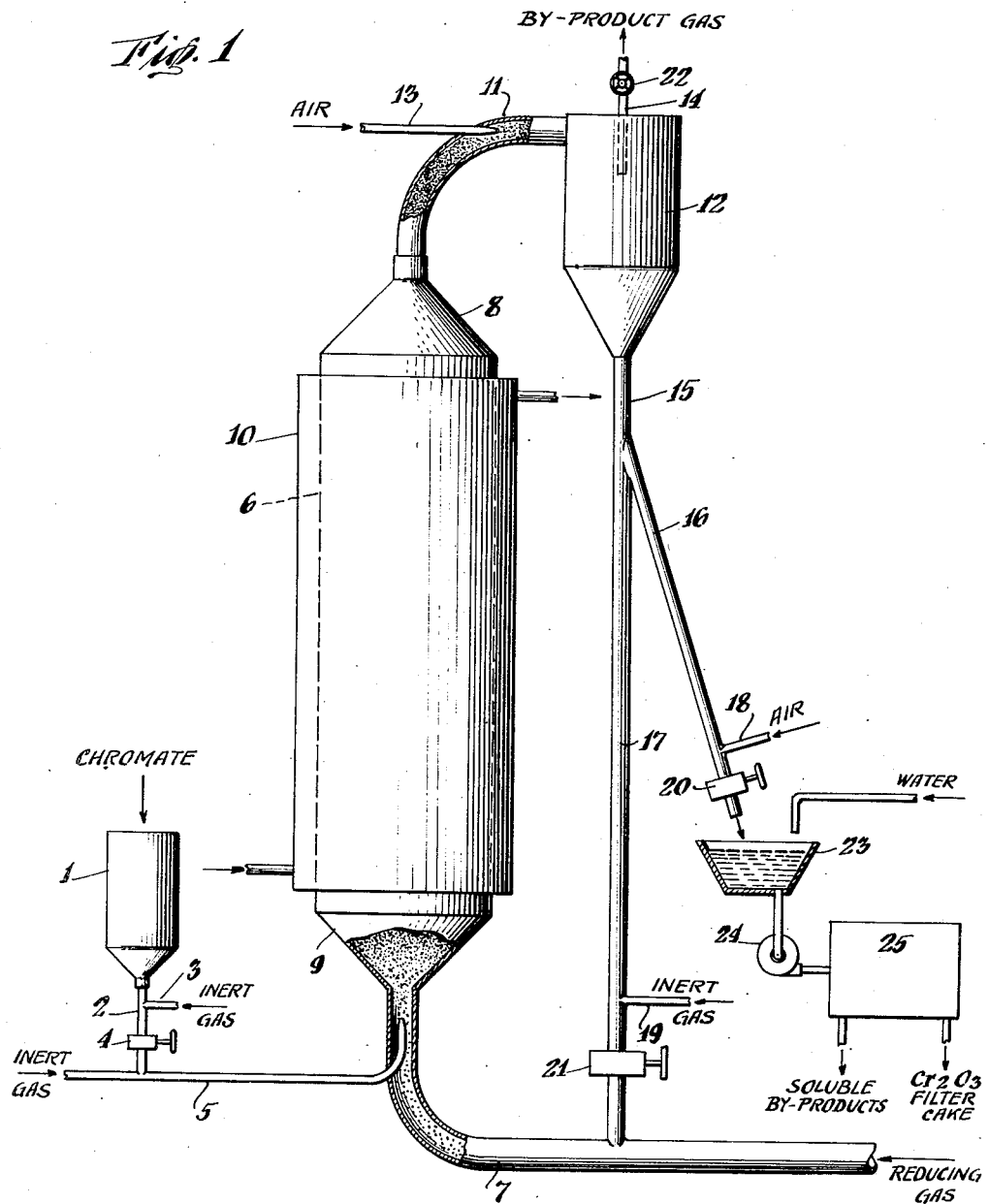

March 13, 1951     J. C. KALBACH     2,544,687
PRODUCTION OF CHROMIUM OXIDE

Filed April 4, 1947     2 Sheets-Sheet 1

INVENTOR
John C. Kalbach
BY Paul W. Garbo
ATTORNEY

March 13, 1951

J. C. KALBACH 2,544,687

PRODUCTION OF CHROMIUM OXIDE

Filed April 4, 1947

2 Sheets-Sheet 2

INVENTOR
John C. Kalbach
BY Paul W. Garbo
ATTORNEY

Patented Mar. 13, 1951

2,544,687

UNITED STATES PATENT OFFICE 2,544,687

PRODUCTION OF CHROMIUM OXIDE

John C. Kalbach, New York, N. Y.

Application April 4, 1947, Serial No. 739,472

12 Claims. (Cl. 23—145)

This invention relates to the manufacture of green chromium oxide pigment, $Cr_2O_3$, from compounds containing chromium at the hexavalent oxidation level.

Conventionally, chromium oxide is manufactured by mixing together in suitable proportions, sodium dichromate and sulfur. To these are added smaller amounts of sodium chlorate and a carbohydrate such as starch, often, also, some soda ash. The whole is placed in large piles and set afire after which the residue is leached, filtered, dried and pulverized to give a finished product.

The above process and product are open to several objections and present several difficulties to those who exploit them. The process releases to the atmosphere large quantities of sulfur dioxide under conditions such that this nuisance is difficult to control. In consequence, the process is usually carried out in remote localities where the damage to the surroundings is relatively unimportant or in furnace spaces surmounted by very high stacks to moderate the local nuisance. Such measures are not always effective in preventing litigation arising from damage to neighboring property.

The reaction between sodium dichromate and sulfur proceeds substantially as follows:

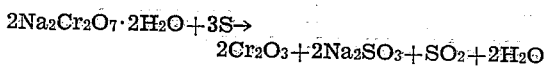

$$2Na_2Cr_2O_7 \cdot 2H_2O + 3S \rightarrow$$
$$2Cr_2O_3 + 2Na_2SO_3 + SO_2 + 2H_2O$$

However, the reaction will not propagate itself throughout the mass of reactants without the presence of chlorate and carbohydrate, the sole function of which is to provide a local source of heat when the reaction would otherwise die out. This theoretically unnecessary addition appreciably increases the cost of the process and renders hazardous the mixing of the ingredients.

During the progress of the reaction, sulfur dioxide and water vapor are released at high temperature and blow out of the reacting pile at high velocity, meanwhile the sodium dichromate becomes temporarily molten before being changed to the infusible chromium oxide. Under these conditions the gases tend to leave the bed in local blow-holes. There are great variations in temperature through the reacting pile as well as in the time during which the various parts of the pile are exposed to high temperatures. The exposed surfaces and the blow-holes cool off very rapidly while other parts may remain red hot for hours unless deliberately broken up. The mass of reaction products acts as an efficient insulating blanket. There is more or less loss of sulfur from the pile resulting locally in incomplete reduction of the dichromate. Too much sulfur cannot be used because of the expense involved and the possibility of condensing sulfur from the interior of the pile on the cooler exterior portions thereof.

The product of the above described process is extremely non-uniform in appearance. The purity and intensity of the color vary from spot to spot, often showing evidence of the formation of black oxide, a very undesirable substance, or of carbonization of carbohydrate. Whereas it is preferred that a pigment be of soft texture, chromium oxide prepared according to the conventional method is one of the most difficult of commercial pigments to grind, and extremely non-uniformly so.

The relatively hard sintering of parts of the reacting mass enforces the prolonged leaching of the residue at rather high temperatures in order to break up the harder lumps, free all the soluble salts and prepare the pigment for filtration and drying.

The conventional process is obviously handicapped by its batchwise nature as regards both operating cost and the use or disposal of the sulfur dioxide produced. Various methods of overcoming the above difficulties and objections, such as the reduction of chromates in furnaces with solid reducing agents, in solution with hydrogen sulfide or colloidal sulfur, or in kilns with gaseous reducing agents, have been suggested in the past. None has become a commercial success or has displaced the above described process. In particular, it has not been commercially feasible to use gaseous reducing agents.

It is a principal object of this invention to provide a pigment chromium oxide which is purer in color, stronger and more easily ground than conventional chromium oxides.

Another important object is to make use of other and cheaper reducing agents than sulfur in the production of chromium oxide.

A further object is to provide means whereby the sulfur dioxide or other gases which are formed in the process are released in such manner that they can be disposed of in any desired way or can be made into valuable by-products.

A further object is to provide a process for the manufacture of chromium oxide which requires no special chemicals to maintain continuity of reaction.

A further object is to provide a continuously operating process in which all reactants are subjected to substantially the same temperature and other reaction conditions.

A still further object is to provide a residue from the reduction reaction from which the soluble by-products can be simply and quickly separated.

A still further object is to provide a pigment chromium oxide which is distinguished by great uniformity of color and physical properties from particle to particle as well as from the product of one day to that of another.

Other objects will appear from the following description of the invention and of its preferred embodiments presented in connection with the attached drawings.

I have discovered that if the reaction is carried out between a finely divided chromate and a gasiform reducing agent in the presence of a large amount of finely divided solid reaction products with strong agitation of the whole reaction mass, the process goes on smoothly and controllably without appreciable agglomeration of the solid particles and results in the formation of a reaction product which is distinguished for its ready finishing into chromium oxide of remarkable softness, strength and purity of color. Accordingly, in the practice of my invention I arrange to have a comparatively large mass of finely divided reaction products to which a comparatively small amount of chromate is added. The whole is strongly agitated and brought in contact with a reducing gas or vapor. The agitation may be obtained in any of several types of machine as for instance in a trough or kiln-like device provided with mixing blades or beater arms or in a ball mill arranged for operation at high temperatures and with controlled atmospheres. However, I prefer to use the technique known as fluidization according to which a stream of gas or vapor is passed upwardly through a bed of suitably sized particles at a velocity at which the particles become suspended in the gas and are maintained in a state of constant agitation. Solids so treated acquire many of the properties of a liquid and may be moved about by means of pipes and valves. A bed of fluidized solids is remarkable for the securement of uniform temperature throughout its mass and for the high rates of heat transfer which are possible through heat exchange surfaces or walls in contact with the fluidized solids.

For the purposes of the present invention, the solid in the fluidized bed is predominantly chromium oxide, to which a chromate is more or less continuously added in quantities substantially stoichiometrically equivalent to the flow of gasiform reducing agent. The density of the fluidized bed and the violence of the action therein can be controlled by varying the rate of flow of gas up through the bed. The vertical velocity of the gas also depends in great measure on the size of the solid particles in the bed.

I have found that if the chromium oxide is present in particles all of which are finer than 60 mesh and about 50% of which are finer than 200 mesh, a particularly suitable gas velocity is, for instance, from about 1 to 4 feet per second. Coarser or finer particles may be used, if desired, as fine as 80% through a 200 mesh screen and as coarse as ¼ inch maximum. With the coarser particles a higher gas velocity would be used, up to even 20 feet per second, and with the finer particles down to 0.25 foot per second. The aforementioned velocity range is preferred, representing a good combination of high reactor capacity, high particle reactivity, high heat transfer rate and freedom from agglomeration of the particles by temporarily softened chromate.

It is well to observe that it is possible for inert diluents to be included in the fluidizing reducing gas. In fact, it will appear later that in certain cases this is eminently desirable.

Essential to the maintenance of fluidization in the reacting bed is the presence in that bed of a preponderance of particles which will not melt or become tacky under reaction conditions; for this purpose, particles of chromium oxide itself are preferred. This preponderance may be obtained by merely having the reaction vessel large in size compared to the volume of unconverted chromate which is present in that vessel at any given time. Another and preferable method is to provide a recycling stream of comminuted chromium oxide which mixes with the chromate before the latter reaches reaction temperature. Obviously, either washed, dried, and pulverized chromium oxide or the infusible reaction products from the reactor may constitute the recycle stream, though the economic preference is for the latter.

To ensure that the reactor contains a sufficient preponderance of particles which will not melt or become tacky under reaction conditions, I have found certain indirect criteria extremely practical. Thus, where my process is conducted without the use of a solids recycle stream, the residence time of the solids in the reactor should be at least about 5 minutes and preferably about 10 to 40 minutes. Where a recycle stream is used, the foregoing residence times may be divided by approximately twice the ratio of the weight of the recycle stream to the weight of the chromate stream entering the reactor because not only is there more inert material present but also it is better disposed to achieve its purpose. For this reason, I prefer to use a recycle ratio (weight of recycled solids to weight of fresh chromate feed) in the range of about 5 to 20.

It is advantageous to carry the chromate into the reaction chamber by means of a stream of gas which is at a temperature below the melting point of the chromate. A mixture of nitrogen and carbon dioxide is a suitable choice if the reducing gas itself will not do. When chromium oxide is recycled, it is advisable to carry it into the reactor by entrainment in the stream of reducing gas, mixing the chromate stream and the chromium oxide stream just prior to their entry into the reactor. At the point where the mixing takes place I prefer to have the pipe carrying the chromium oxide and the reducing gas take the form of an annulus surrounding the pipe carrying the chromate. For best results, this mixing point should be below the reactor and pointed upward into it so that, effectively, the chromate is discharged directly into the fluidized bed at high velocity, surrounded by a stream of chromium oxide likewise moving at high velocity.

When I use a reducing agent which is in the gaseous or vapor state at temperatures below the softening point of the chromate, as, for instance, carbon monoxide or producer gas, it is not essential to provide a separate transport pipe and gas stream for the chromate. The reducing gas may be used to carry both the chromate and recycled chromium oxide to the reactor. The transport pipe itself will be found to provide adequate mixing. Further, the chromate may be carried by a stream of sulfur vapor provided the sulfur vapor receives the recycled chromium oxide before picking up the chromate. Again, the chromate may be fed to the reactor in liquid form from a spray nozzle discharging directly into the fluidized bed. Other variants will occur to those skilled in the art.

Control over the reaction temperature may be established by any of several means. The whole system may be insulated to prevent heat losses and the reaction vessel may be provided with a jacket or other heat transfer means by which excess reaction heat may be removed. This arrangement has the advantage that the heat energy may be used to produce steam or may be otherwise profitably employed. Where a circulating stream of chromium oxide is used, this stream may be passed through a heat transfer system separate from the reactor to maintain the desired temperature within the reactor. When the reaction vessel is small and the heat loss unimportant, temperature control may be had by simply allowing the excess heat to leak out of the system. A vernier control on any of the above measures can be the rate of recirculation of chromium oxide.

If desired, the process may be carried out under pressure, up to about 5 atmospheres. By this means the capacity of a given sized unit is increased and the decomposition of sodium sulfite formed in the reaction is inhibited.

Reacted material may be removed from a fluidized reactor by permitting it to run full, the material being carried out by the effluent gases. Alternatively, the fluidized reactor may be only partly filled with solids which may be drained off through a standpipe connected to the vessel at some point below the top surface of the fluid bed. Entrained solids may be separated from the effluent gases by means of a cyclone, a filter element or other suitable device. The gas may then be vented, if of an innocuous nature, or may be absorbed or converted into valuable by-products such as sulfuric acid, as desired.

In order to take complete advantage of the benefits which accrue to my invention, I prefer to pick up the solid products issuing from the reaction system with a stream of water, which may itself be the means of separating solids and gas, and to transport them directly to a filter unit where they are readily washed free of soluble by-products. I am enabled to do this by the remarkable freedom of my reaction product from hard, sintered clusters of particles which are characteristic of conventional processes. I am thereby enabled to eliminate the prolonged leaching with hot water in agitated tanks which the former processes required.

While chromic acid or any chromate may be the raw material in carrying out my invention, I prefer to use sodium chromate, sodium dichromate or chromic acid, and especially the first two, separately or together. With the preferred raw materials, the by-products are water soluble and readily separable from the chromium oxide product, an advantage not shared by many of the other chromates. It is advisable to use anhydrous chromates because of their comparatively high melting points and because the combined water of the hydrous salts is split off in the reaction chamber, diluting the reducing gas and hydrolyzing part of the sodium salts which are present.

Since there are appreciable differences in the behavior of the three preferred starting chromium compounds, I will discuss these in detail on the basis of the following reactions:

$$4CrO_3 + 3S \rightarrow 2Cr_2O_3 + 3SO_2 \quad (1)$$
$$2Na_2Cr_2O_7 + 3S \rightarrow 2Cr_2O_3 + SO_2 + 2Na_2SO \quad (2)$$
$$4Na_2CrO_4 + 3S \rightarrow 2Cr_2O_3 + Na_2O + 3Na_2SO_3 \quad (3)$$
$$2CrO_3 + 3CO \rightarrow Cr_2O_3 + 3CO_2 \quad (4)$$
$$Na_2Cr_2O_7 + 3CO \rightarrow Cr_2O_3 + 2CO_2 + Na_2CO_3 \quad (5)$$
$$2Na_2CrO_4 + 3CO \rightarrow Cr_2O_3 + CO_2 + 2Na_2CO_3 \quad (6)$$
$$Na_2Cr_2O_7 + 2Na_2CrO_4 + 3S \rightarrow 2Cr_2O_3 + 3Na_2SO_3 \quad (7)$$

It will be observed in reactions (1) and (4) that chromic anhydride gives rise to only gaseous by-products. This contributes elements of simplicity process-wise but the high cost of chromic anhydride usually militates against its use. When sodium chromate is used alone, the reaction (3) with sulfur vapor gives a certain amount of sodium oxide, a somewhat undesirable component in a fluidized reaction bed, because it reacts with any water vapor in the gas stream to form readily fusible sodium hydroxide. It will be found that, of the three starting compounds here discussed, chromic anhydride is the most reactive, sodium chromate the least. When sulfur vapor is the reducing agent, it is advantageous to use mixtures of the two salts containing up to 2 mols of sodium chromate for each mol of sodium dichromate (7). All mixtures of the two salts are readily usable when carbon monoxide is the reducing agent. It will be observed that reaction (7) shows no gaseous by-products. Accordingly, it is necessary to use an excess of reducing gas or to mix an inert gas with the reducing gas. For a fluidized operation, I recommend that where stoichiometry predicts the gaseous by-products to be less in volume than one-third the volume of the reducing gas and no excess is used, enough inert gas be added to the reducing gas to make the outgoing gas not less than one-third the volume of the incoming gas. However, a fluidized reaction system is operable with as little as one-tenth as much outgoing as incoming gas. It becomes obvious from the foregoing equations and discussion that the gas volume usually decreases as the reaction proceeds. Linear gas velocities set forth in this specification are based on the volume of incoming gas measured at the temperature and pressure existing in the reactor and not corrected for any volume change ensuing from reaction.

It is a particular advantage of my process that reducing agents other than sulfur can be used with success. These include carbon monoxide, producer gas, water gas, methane, natural gas, formaldehyde and other gaseous or vaporous reducing agents. In fact, where sulfur dioxide cannot be considered a valuable by-product, I prefer to use carbon monoxide or producer gas as the reducing agent. Hydrogen-containing gases are less desirable reducing agents because they give rise to by-product water vapor which at the reaction temperature tends to hydrolyze sodium carbonate or sulfite and thus form the fusible hydroxide.

Reduction of the chromium compound proceeds rapidly with sulfur as the reducing agent at any temperature above the boiling point of sulfur. I have found that pigments of excellent quality are formed at good reaction rates at temperatures in the range of about 1200° to 1400° F. With carbon monoxide, the reaction goes easily at temperatures above 900° F.; the preferred temperature range is the same as with sulfur.

Since the reducing agent is generally less expensive than the starting chromium compound, it is advantageous but by no means essential to introduce a small excess, say 2 to 3%, of reducing agent into the reactor. When this excess is sulfur, I frequently add an amount of air at least stoichiometrically equivalent to the excess to the gas stream as it leaves the reaction vessel and before the solids are removed from the gas stream. In this way, unreacted sulfur is converted to sulfur dioxide and contamination of the solids with sulfur is prevented. Of course, if the solids separation is carried out at temperatures above the boiling point of sulfur, e. g., if the solids are drained directly from a fluidized reaction bed, the preceding precaution need not be observed.

For the accurate control of the shade of the chromium oxide pigment, it may be advisable to add a reagent such as sodium carbonate to control the pH of the wash or leach water. This reagent may be added to the materials going to the reactor or directly in the leaching step.

Figure 2:
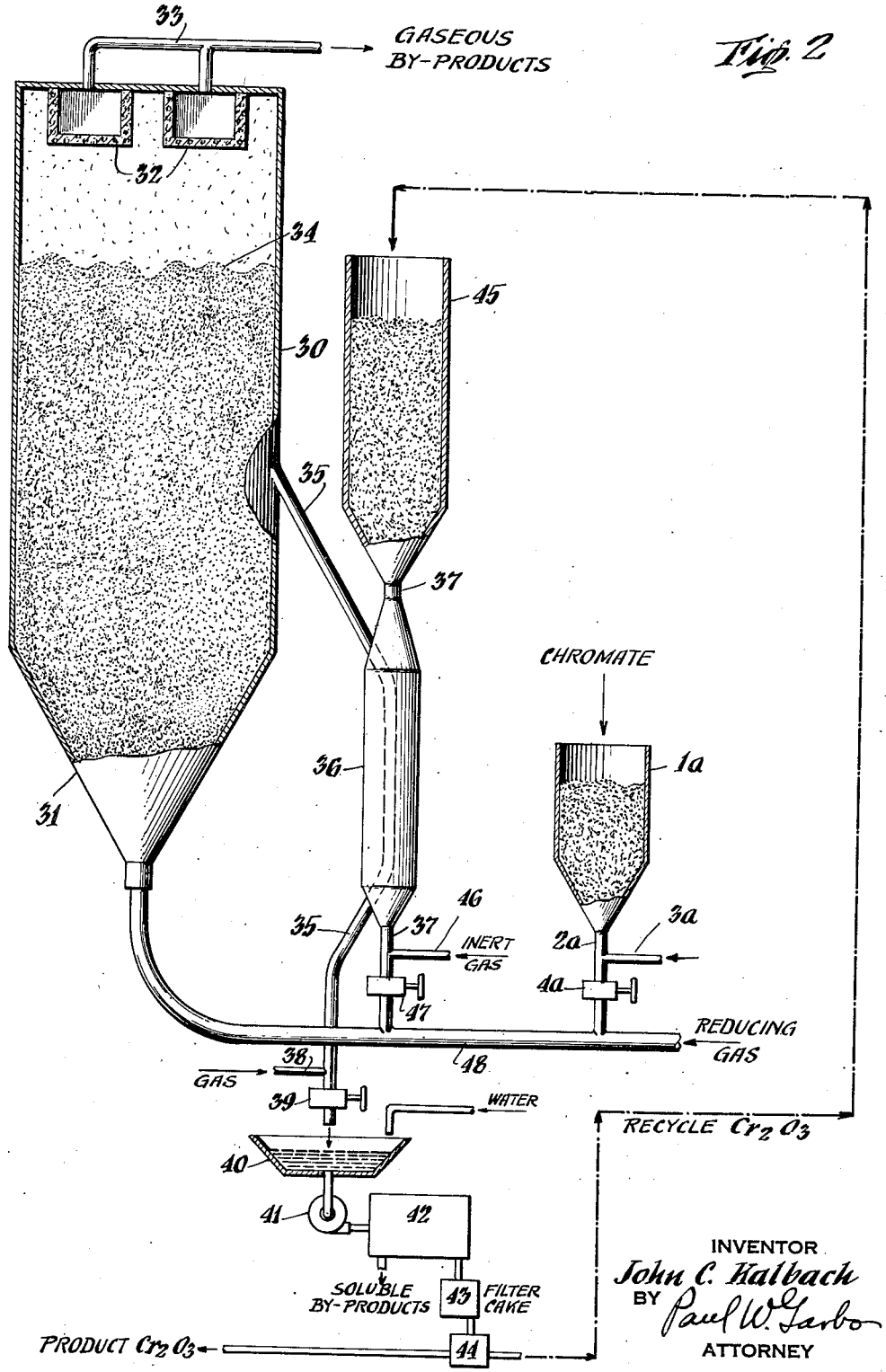

To exemplify preferred embodiments of my invention, the following drawings are attached hereto:

Figure 1 shows in diagrammatic form the process and suitable equipment therefor wherein sulfur is used as the reducing agent, and Figure 2 shows another form of the invention employing a reducing agent which is in the gaseous state at temperatures below the melting point of the chromate used as starting material.

Referring to Figure 1, an aerated hopper 1 is charged with comminuted chromate. If the chromate is anhydrous, the aerating or fluidizing medium, e. g., air, should be warm and dry to prevent hydration. The chromate is withdrawn through pipe 2 provided with flow control means 4 which may take the form of a slide valve. Immediately above slide valve 4 is a connection 3 through which a small stream of inert gas is admitted to keep the finely divided chromate in a free-flowing condition in pipe 2. A stream of inert gas in carrier pipe 5 serves to transport the chromate into reactor 6. Carrier pipe 5 is preferably bent smoothly so as to point upwards into the inlet to reactor 6, and is concentric with carrier pipe 7 within which it terminates, as shown. The linear velocity of the gas in pipe 5 may be from 10 to 60 feet per second when using particles of the preferred size, namely, all finer than 40 mesh and 25% to 80% finer than 200 mesh. Reactor 6 is a vertically disposed cylindrical vessel equipped at top and bottom with frustro-conical sections 8 and 9. The horizontal cross-section of the vessel will be determined by the capacity of the unit as obviously related to the desired linear gas velocity therethrough. This gas velocity should be from about 0.25 to 20 feet per second, preferably about 1 to 4 feet per second. Reactor 6 is provided with a jacket 10 or other suitable means for carrying away the excess heat of the exothermic reaction and controlling the temperature in reactor 6 to some value above the boiling point of sulfur at the pressure existing in the vessel, preferably at a temperature of about 1200° to 1400° F. Reactor 6 should be made of a material such as high chrome alloy steel or a refractory which is chemically resistant to the conditions of service. A fluidized bed is maintained throughout reactor 6 overflowing through exit pipe 11 to cyclone separator 12 or other means for separating the solids from the gas. Pipe 11 is provided with a connection 13 through which air may be admitted to burn any sulfur vapor which passes unconsumed through the reactor. Outlet pipe 14 from cyclone 12 takes the gaseous by-products of the reaction to any desired point of disposal or use. Outlet pipe 14 is provided with a throttling valve 22 to control the pressure in the system. Standpipe 15 from cyclone 12 has two branches 16 and 17 provided, respectively, with aerating and purge connections 18 and 19 and flow control means 20 and 21. From branch 16 is withdrawn a stream of reacted material equivalent to the feed stream in pipe 5. Branch 17 handles the stream of chromium oxide which is recycled to the reactor. This oxide is picked up by a stream of reducing gas in carrier pipe 7 and returned therewith to the reactor. To fully capitalize on the advantages of my invention, the reacted material from branch 16 of standpipe 15 should be immediately suspended in water as in tank 23 and transferred as by pump 24 to washing filter 25 where the solids are freed of soluble salts and delivered in the form of a chromium oxide filter cake for drying and pulverization in the usual manner.

The equipment shown in Figure 1 is also well adapted for use where the reducing agent is in the vapor state at temperatures below the softening point of the chromate. Under these conditions, the stream of inert gas entering through pipe 5 may be replaced with part of the reducing gas and air connection 13 omitted.

Figure 2 shows a reaction vessel 30 with a lower conical section 31 and with filter elements 32 at the top to clean the issuing gases of solids. These gases are taken off through pipe 33 to any desired means of disposal. Vessel 30 is kept only partly filled with the reaction mass which exhibits a "pseudo-liquid level" 34 above which the concentration of solid particles in the gas is comparatively small. Solid products are withdrawn through standpipe 35 which passes through jacket 36 in heat transfer relationship with the inflowing stream of recycled, dried and pulverized chromium oxide entering jacket 36 by way of pipe 37. The outgoing solid reaction products are kept fluent in standpipe 35 by a small stream of an inert gas entering at connection 38 immediately above flow control means 39. The solid products are mixed with water in tank 40 and transferred by means of pump 41 to washing filter 42 where the soluble by-products are washed out. The washed chromium oxide filter cake is dried in dryer 43 and ground in pulverizer 44 after which a major portion of it is returned to hopper 45. The remainder is taken off as product chromium oxide. Hopper 45 empties into pipe 37 which, as previously mentioned, discharges into jacket 36. The chromium oxide in standpipe 37 flows, with the aid of inert gas introduced through connection 46, through slide valve 47 into pipe 48. Here it is mixed with a stream of reducing gas which already carries a supply of chromate from hopper 1a and thus mixed is borne into reactor 30. Control of temperature in reactor 30 is achieved by means of the heat transfer jacket 36 and the rate of flow of recycled chromium oxide.

Obviously, various combinations of the features of Figures 1 and 2 are possible. Many other well-known means for separating gases and solids as well as other procedures for recycling solids are feasible.

In a specific example of the practice of my invention in apparatus of the type shown in Figure 1, the straight section of reactor 6 is 5 feet long and 1 foot in internal diameter. The walls of the bottom conical section incline no more than 30° from the vertical. An anhydrous mixture containing 9.85% sodium chromate and 90.15% sodium dichromate is fed at a rate of 3340 pounds per hour by means of an inert gas stream, e. g., nitrogen, amounting to 1590 standard cubic feet per hour. The transport pipe 5 is made of 1¼-inch standard size pipe. The linear gas velocity at the bottom of the reactor is about 3 feet per second decreasing to about 1.75 feet per second at the top. The reactor 6 is maintained at a temperature of 1200° F. The products are carried off through a 3-inch pipe 11, mixed with 960 standard cubic feet per hour of air entering through pipe 13 and passed to a cyclone separator 12, the outlet 14 from which is throttled by valve 22 to maintain a pressure of 15 pounds per square inch gauge in the reaction system. The standpipe 15 of the separator 12 consists of 2-inch pipe. Sulfur vapor amounting to 615 pounds per hour comes from a sulfur boiler though a 3-inch pipe 7 at a temperature of 1000° F., picks up the recycled material discharging from pipe 17 which amounts to 22,000 pounds per hour and carries it into the reactor 6. The 3-inch pipe 7 is enlarged to 4 inches near the entrance to the reactor 6 where it contains the concentrically disposed carrier pipe 5 for chromate. About 1707 pounds of sodium sulfite and 1905 pounds of chromium oxide are withdrawn each hour from the standpipe 16, mixed in tank 23 with about 3000 gallons of water and the resulting suspension is forced by pump 24 to a continuous washing filter 25. The filter cake is dried and pulverized. About 336 pounds of sulfur dioxide per hour are recovered from the gases leaving cyclone 12, mixed with air and added to a stream of sulfur burner gases going to a sulfuric acid plant. The chromium oxide recovered is of outstanding cleanness of tone, strength and softness.

In another example with the apparatus of Figure 2, a cylindrical reactor with an internal diameter of 1 foot is used with carbon monoxide as the reducing agent. An anhydrous mixture containing 38.2% sodium chromate and 61.8% sodium dichromate is delivered from hopper 1a at a rate of 1285 pounds per hour into a 1½-inch line 48 carrying 2720 standard cubic feet per hour of carbon monoxide. Shortly thereafter about 13,000 pounds per hour of recycled chromium oxide is delivered from pipe 37 into the same line at which point the line expands to 3½-inch size. The whole mixture travels into the reactor 30 which is maintained at a temperature of 1250° F. The linear gas velocity at the bottom of the reactor 30 is about 2.9 feet per second, decreasing to about 1.7 feet per second at the top. The reactor 30 is maintained at a pressure of 15 pounds per square inch gauge. The gaseous reaction products pass out of the top of the reactor through alundum filters 32 and a 3-inch pipe 33. The reaction solids are withdrawn through pipe 35 at an hourly rate corresponding to 13,682 pounds of chromium oxide and 642 pounds of soda ash. The product chromium oxide recovered from the withdrawn reaction solids by washing, drying and pulverization is a pigment of very desirable properties.

Obviously, many variations from the particular details which have been described for purposes of illustration are possible without departure from the spirit of this invention. For instance, Figure 2 shows the recycled solids stream and the withdrawn stream of reaction solids in concurrent indirect heat exchange relationship; the rearrangement of the conduits to establish a desirable countercurrent flow relationship between these streams is obviously within the purview of those skilled in the art. Accordingly, the claims should not be interpreted in any restrictive sense other than that imposed by the limitations recited within the claims.

The expression, salt of chromic acid, is used generically in the claims to embrace chromates containing the divalent $CrO_4^=$ radical and dichromates containing the divalent $Cr_2O_7^=$ radical, since both types of salts are derived from chromic acid, the hypothetical hydrate of chromic anhydride, which exists only in solution or in the form of salts.

I claim:

1. A continuous process for the manufacture of chromium oxide by the reduction of a comminuted compound of hexavalent chromium by reaction solely with a gasiform reducing stream, which comprises introducing said comminuted compound into a fluidized mass consisting essentially of the comminuted solid products of said reaction of said comminuted compound with said reducing stream, the rate of introduction of said comminuted compound being controlled to effect the entry of each part by weight of said comminuted compound into at least 5 parts by weight of said fluidized mass, passing said reducing stream through said fluidized mass maintained at an elevated temperature effective for said reduction, effecting said reduction of said comminuted compound within said fluidized mass by reaction solely with said reducing stream, withdrawing a gaseous reaction effluent from said fluidized mass, withdrawing a portion of said fluidized mass corresponding to the rate of introduction of said comminuted compound into said fluidized mass, and recovering chromium oxide from said withdrawn portion.

2. The process of claim 1 wherein the compound of hexavalent chromium is principally sodium dichromate.

3. The process of claim 1 wherein the compound of hexavalent chromium is principally sodium chromate.

4. The process of claim 1 wherein the gasiform reducing stream comprises methane.

5. The process of claim 1 wherein the gasiform reducing stream comprises carbon monoxide.

6. The process of claim 5 wherein the compound of hexavalent chromium is principally sodium dichromate.

7. A continuous process for the manufacture of chromium oxide by the reduction of a comminuted compound of hexavalent chromium by reaction solely with a gasiform reducing stream, which comprises introducing said comminuted compound into a fluidized mass consisting essentially of the comminuted solid products of said reaction of said comminuted compound with said reducing stream, passing said reducing stream through said fluidized mass maintained at an elevated temperature effective for said reduction, effecting said reduction of said comminuted compound within said fluidized mass by reaction solely with said reducing stream, withdrawing a gaseous reaction effluent from said fluidized mass, withdrawing a portion of said fluidized mass, recycling part of said withdrawn portion to said fluidized mass at a rate corresponding to about 5 to 20 times the weight of said comminuted compound being introduced into said fluidized mass, and recovering chromium oxide from said withdrawn portion.

8. The process of claim 7 wherein the compound of hexavalent chromium is principally sodium dichromate.

9. The process of claim 7 wherein the compound of hexavalent chromium is principally sodium chromate.

10. The process of claim 7 wherein the gasiform reducing stream comprises carbon monoxide.

11. The process of claim 7 wherein the gasiform reducing stream comprises methane.

12. A continuous process for the manufacture of chromium oxide by the reduction of a comminuted compound of hexavalent chromium by reaction solely with a gasiform reducing stream, which comprises introducing said comminuted compound into a fluidized mass consisting essentially of the comminuted solid products of said reaction of said comminuted compound with said reducing stream, passing said reducing stream through said fluidized mass maintained at an elevated temperature effective for said reduction, effecting said reduction of said comminuted compound within said fluidized mass by reaction solely with said reducing stream, withdrawing a gaseous reaction effluent from said fluidized mass, withdrawing a portion of said fluidized mass, recovering chromium oxide from said withdrawn portion, and recycling part of said recovered chromium oxide to said fluidized mass.

JOHN C. KALBACH.

REFERENCES CITED

The following references are of record in the file of this patent:

UNITED STATES PATENTS

| Number | Name | Date |
|---|---|---|
| 1,158,379 | Gessler | Oct. 26, 1915 |
| 1,350,419 | Morrison | Aug. 24, 1920 |
| 2,343,780 | Lewis | Mar. 7, 1944 |
| 2,393,704 | Ozorgaly | Jan. 29, 1946 |